(12) United States Patent
Scholl et al.

(10) Patent No.: US 11,541,989 B2
(45) Date of Patent: Jan. 3, 2023

(54) DUCTED FAN OF AN AIRCRAFT AND AIRCRAFT

(71) Applicant: Dr. Ing. h.c. F. Porsche Aktiengesellschaft, Stuttgart (DE)

(72) Inventors: Patrick Scholl, Bietigheim-Bissingen (DE); Jens-Ole Thoebel, Hankensbuettel (DE); Christian Wenzel, Untergruppenbach (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 17/499,879

(22) Filed: Oct. 13, 2021

(65) Prior Publication Data

US 2022/0111950 A1  Apr. 14, 2022

(30) Foreign Application Priority Data

Oct. 14, 2020 (DE) ...................... 10 2020 127 041.0

(51) Int. Cl.

| | |
|---|---|
| *B64C 11/10* | (2006.01) |
| *B64C 3/32* | (2006.01) |
| *B64C 11/00* | (2006.01) |
| *B64C 27/24* | (2006.01) |
| *B64C 29/00* | (2006.01) |

(52) U.S. Cl.
CPC ............ *B64C 11/001* (2013.01); *B64C 27/24* (2013.01); *B64C 29/0025* (2013.01)

(58) Field of Classification Search
CPC ... B64C 11/001; B64C 27/24; B64C 29/0025; B64C 3/32
See application file for complete search history.

(56) References Cited

U.S. PATENT DOCUMENTS

| | | | | |
|---|---|---|---|---|
| 2,961,189 | A * | 11/1960 | Doak | B64C 29/0033 244/12.4 |
| 7,472,863 | B2 * | 1/2009 | Pak | B64D 35/04 244/12.5 |
| 10,570,926 | B2 * | 2/2020 | Maciolek | F04D 29/563 |
| 11,242,139 | B2 * | 2/2022 | Schroeder | B64C 11/001 |

(Continued)

FOREIGN PATENT DOCUMENTS

| | | |
|---|---|---|
| DE | 102018116144 A1 | 1/2020 |
| DE | 102018116147 A1 | 1/2020 |

(Continued)

*Primary Examiner* — Brian M O'Hara
(74) *Attorney, Agent, or Firm* — Leydig, Voit & Mayer, Ltd.

(57) ABSTRACT

A ducted fan for an aircraft includes a rotor-side fan and a stator-side duct that surrounds the rotor-side fan. The stator-side duct includes an inner wall facing the rotor-side fan and an outer wall averted from the fan. The ducted fan further includes a fastening device configured to support mounting of the ducted fan on a structural component of the aircraft. The fastening device includes a pin and a guide body. The guide body is configured to receive and guide the pin, the pin is insertable proceeding from the inner wall into a recess of the guide body, a first end of the pin protrudes relative to the outer wall, and the pin is configured to be mounted, via the first end, on a bearing of the structural component of the aircraft.

10 Claims, 5 Drawing Sheets

(56) References Cited

U.S. PATENT DOCUMENTS

| | | |
|---|---|---|
| 2002/0100834 A1 | 8/2002 | Baldwin |
| 2009/0077946 A1* | 3/2009 | Ishiba |
| 2017/0211422 A1* | 7/2017 | Beier .................. F02C 7/20 |
| 2020/0010186 A1 | 1/2020 | Bender et al. |
| 2020/0010210 A1 | 1/2020 | Warbeck |
| 2020/0262553 A1 | 8/2020 | Gomez |
| 2021/0237852 A1 | 8/2021 | Fauri et al. |

FOREIGN PATENT DOCUMENTS

| | | |
|---|---|---|
| DE | 102018116149 A1 | 1/2020 |
| DE | 102018116153 A1 | 1/2020 |
| DE | 102018116166 A1 | 1/2020 |
| DE | 102018120200 A1 | 2/2020 |
| DE | 102018123470 A1 | 3/2020 |
| EP | 3176078 A1 | 6/2017 |
| WO | WO 2019202515 A1 | 10/2019 |
| WO | WO 2020070927 A1 | 4/2020 |

* cited by examiner

DUCTED FAN OF AN AIRCRAFT AND AIRCRAFT

CROSS REFERENCE TO RELATED APPLICATIONS

This application claims benefit to German Patent Application No. DE 10 2020 127 041.0, filed on Oct. 14, 2020, which is hereby incorporated by reference herein.

FIELD

The disclosure relates to a ducted fan of an aircraft and to an aircraft.

BACKGROUND

DE 10 2018 116 144 A1 discloses an aircraft having a fuselage and having wings which engage on the fuselage. Ducted fans are integrated into the wings. The ducted fans can be covered by slats. The ducted fans may be horizontally or vertically fixed. Horizontally fixed ducted fans serve for the propulsion of the aircraft during a vertical takeoff or a vertical landing. Vertically fixed ducted fans serve for generating forward thrust for the aircraft.

DE 10 2018 123 470 A1 has disclosed an aircraft in the case of which multiple ducted fans are integrated into a wing.

DE 10 2018 116 147 A1 has disclosed a further aircraft. Here, fans which assist the vertical takeoff or a vertical landing of the aircraft engage on a nose of the fuselage of the aircraft.

DE 10 2018 116 153 A1 has disclosed an aircraft in which ducted fans engage on a fuselage, specifically the nose of the fuselage, of the aircraft. Here, two ducted fans are combined to form a unit which is pivotable about an axis of rotation, wherein said axis of rotation runs parallel to a pitch axis of the aircraft.

DE 10 2018 116 166 A1 discloses the basic construction of a ducted fan of an aircraft. According thereto, a ducted fan comprises a rotor-side fan, also referred to as rotor, and a stator-side duct, wherein the duct surrounds the fan radially at the outside. The duct defines a flow channel, extending in an axial direction, for air flowing via the fan.

DE 10 2018 116 149 A1 has disclosed a further ducted fan of an aircraft.

DE 10 2018 120 200 A1 also discloses a ducted fan of an aircraft. In the case of this ducted fan, an electric machine is integrated into the duct.

WO 2019/202515 A1 has disclosed a mounting arrangement for a ducted fan. Said mounting arrangement serves for providing acoustic noise suppression.

SUMMARY

In an embodiment, the present disclosure provides a ducted fan for an aircraft. The ducted fan includes a rotor-side fan and a stator-side duct that surrounds the rotor-side fan radially at an outside and defines a flow channel for air flowing via the fan. The stator-side duct includes an inner wall facing the rotor-side fan and an outer wall averted from the fan. The inner wall includes at least one layer composed of fiber-reinforced plastic, and the outer wall includes at least one layer composed of fiber-reinforced plastic. The ducted fan further includes a fastening device formed at a respective circumferential position of the stator-side duct. The fastening devices is configured to support mounting of the ducted fan on a structural component of the aircraft. The fastening device includes a pin and a guide body arranged between the inner wall and the outer wall of the stator-side duct. The guide body is configured to receive and guide the pin, the pin is insertable proceeding from the inner wall into a recess of the guide body, a first end of the pin protrudes relative to the outer wall, and the pin is configured to be mounted, via the first end, on a bearing of the structural component of the aircraft.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

It has hitherto proven difficult to mount a ducted fan easily and securely, with sufficient stiffness, on an adjoining or adjacent load-bearing structure or an adjacent structural component of the aircraft.

The present disclosure describes a new ducted fan of an aircraft and aircraft having such a ducted fan.

The ducted fan has a rotor-side fan and has a stator-side duct, which surrounds the fan radially at the outside and defines a flow channel for air flowing via the fan.

The duct has an inner wall, which faces toward the fan and which is composed of at least one layer composed of fiber-reinforced plastic, and an outer wall, which is averted from the fan and which is composed of at least one layer composed of fiber-reinforced plastic.

The ducted fan furthermore has at least one fastening device which is formed at a respective circumferential position of the duct and by means of which the ducted fan can be mounted on an adjoining or adjacent structural component of the aircraft.

The respective fastening device has a pin and a guide body which is arranged between the inner wall and the outer wall and which serves for receiving and guiding the pin, in such a way that the pin is insertable proceeding from the inner wall into a recess of the guide body, protrudes with one end relative to the outer wall, and can be mounted by way of said end on a preferably spherical bearing of the adjoining or adjacent structural component of the aircraft.

A ducted fan of said type can not only be easily mounted, whilst ensuring tolerance compensation, on an adjoining or adjacent structural component of the aircraft, but a ducted fan of said type also exhibits high stiffness.

The guide body is preferably a metallic, in particular milled, guide body, in particular composed of aluminum.

The pin is preferably a metallic pin. This embodiment is particularly preferred for the secure and simple mounting of the ducted fan on the adjoining structural component of the aircraft.

The guide body is preferably adhesively bonded to the inner wall and to the outer wall, in particular over a full area. The overall structure of the ducted fan can furthermore advantageously be stiffened in this way.

According to one advantageous refinement, adjoining the guide body between the inner wall and the outer wall, there is arranged a foam body encased by at least one layer composed of fiber-reinforced plastic, wherein the guide body is adhesively bonded to the foam body. This refinement also serves for the further stiffening of the ducted fan.

Figure 1:
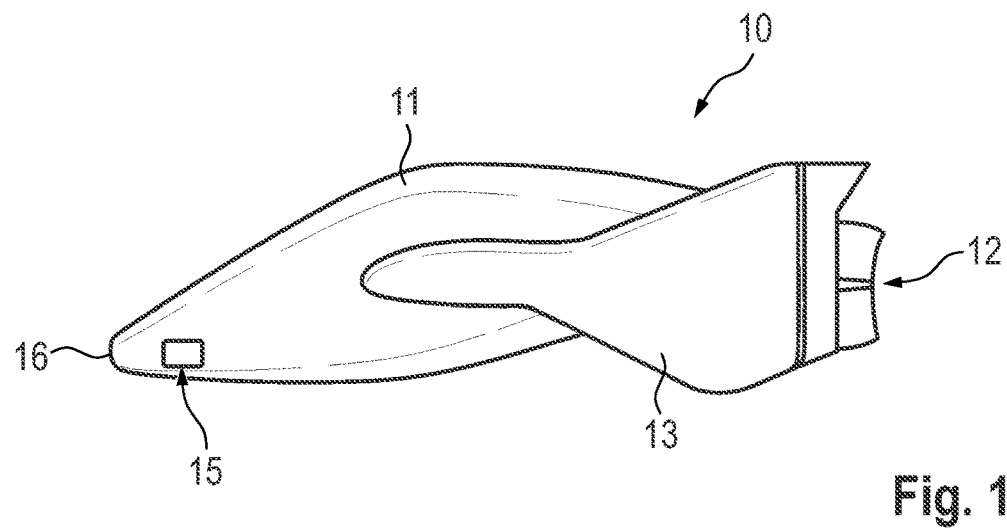
FIG. 1 shows a side view of an aircraft.
Figure 2:
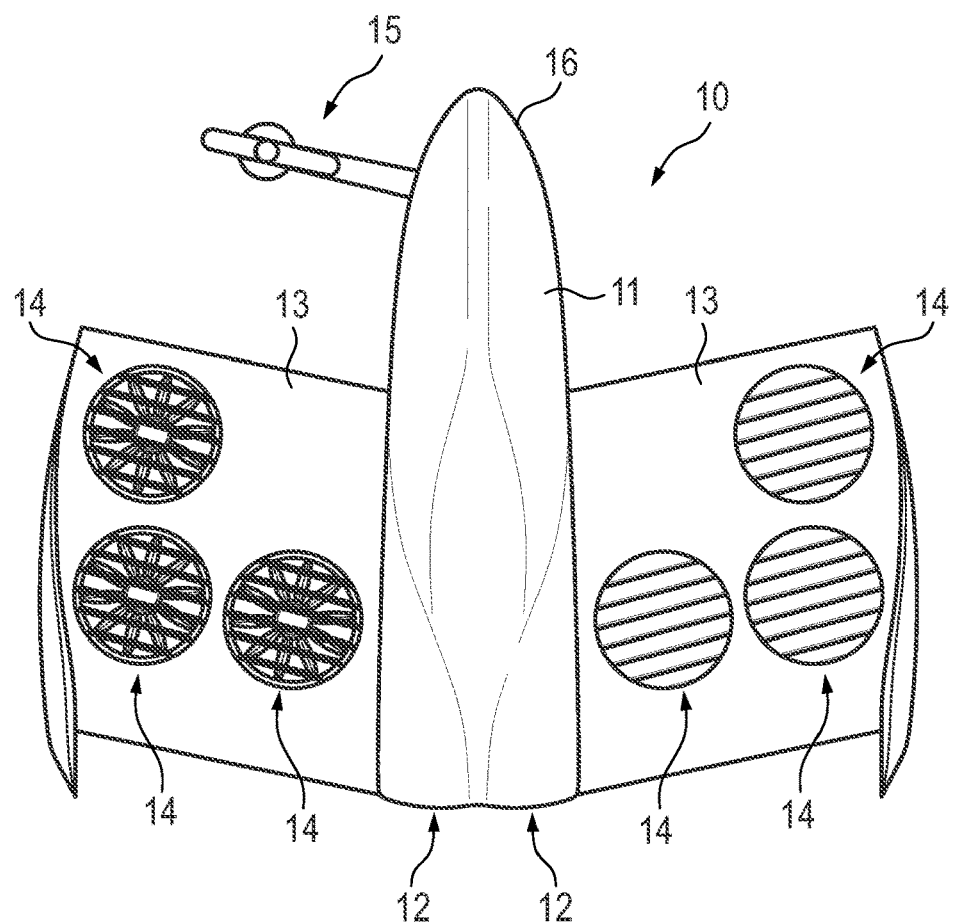
FIG. 2 shows a plan view of the aircraft.

FIGS. 1 and 2 show different views of an aircraft 10.

The aircraft 10 has a fuselage 11, which provides, inter alia, a passenger compartment. The aircraft 10 furthermore has wings 13 which engage on the fuselage 11.

The aircraft 10 is a so-called vertical takeoff aircraft which, upon takeoff, lifts off from the ground vertically and, upon landing, lands on the ground vertically.

In order to allow such vertical takeoff and landing of the aircraft 10, the aircraft 10 has in each case at least one wing lift unit 14, also referred to as WLU, at least in the region of each wing 13. In the exemplary embodiment shown, in each case three such wing lift units 14 are provided in each wing 13.

The vertical takeoff and landing of the aircraft 10 that takes place through the use of the wing lift units 14 can be assisted by means of at least one nose lift unit 15 which engages on a nose 16 of the fuselage 11 of the aircraft 10. A nose lift unit 15 is also referred to as NLU. FIGS. 1 and 2 show a nose lift unit 15 of said type which is positioned on one side of the fuselage 11. It is also possible for two such nose lift units 15 to be used. The nose lift units 15 are preferably pivotable relative to the fuselage 11, specifically such that the respective nose lift unit 15 is pivoted out of the fuselage 11 for takeoff and landing, whereas the respective nose lift unit 15 is pivoted into the fuselage 11 for flight operation after takeoff and before landing of the aircraft 10.

For the forward thrust of the aircraft 10 after it has taken off, the aircraft 10 has at least one forward thrust unit 12, in the exemplary embodiment shown two forward thrust units 12, which are integrated into the rear end of the fuselage 11.

Each of a respective wing lift unit 14 and a respective nose lift unit 15 and a respective forward thrust unit 12 of the aircraft 10 may comprise a ducted fan 17.

Figure 3:
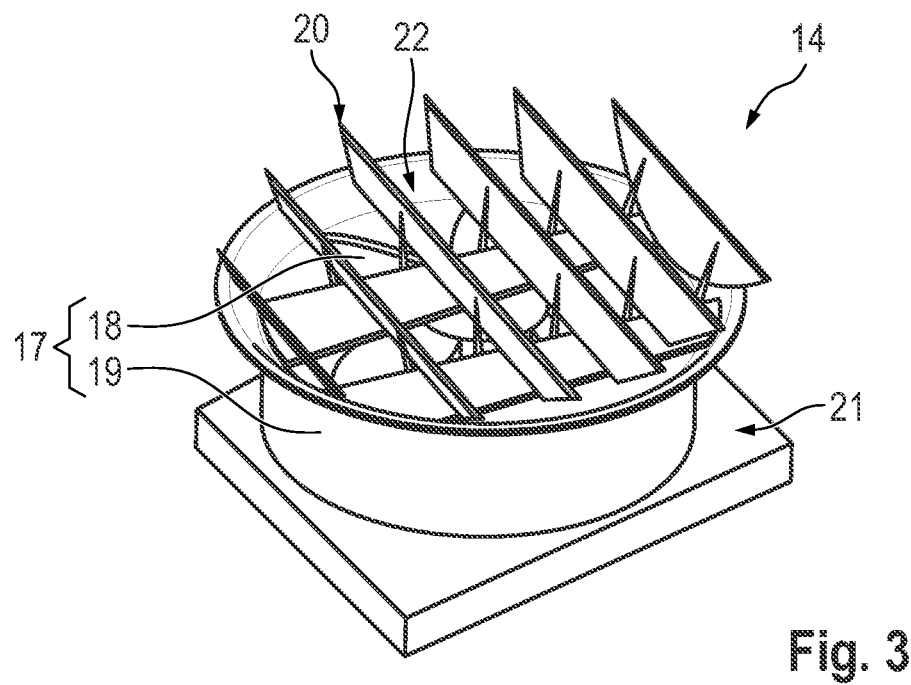
FIG. 3 shows a perspective view of a ducted fan of the aircraft together with slat units.

FIG. 3 shows a perspective view of a wing lift unit 14 that comprises a ducted fan 17. Here, the ducted fan 17 has a rotor-side fan 18 and a stator-side duct 19.

Furthermore, FIG. 3 shows slat units 20, 21, specifically an upper slat unit 20 and a lower slat unit 21, as further assemblies of the wing lift unit 14. For takeoff and landing, the two slat units 20, 21 are opened, and open up a flow channel 22, which is defined by the duct 19 of the ducted fan 17, for a passage of flow.

By contrast, if the wing lift units 14 are not required, in particular during normal flight operation after takeoff and before landing, then the slat units 20, 21 are closed, and close the flow channel 22 of the duct 19 of the respective ducted fan 17.

As already stated, a ducted fan 17 accordingly has the rotor-side fan 18 and the stator-side duct 19. The stator-side duct 19 defines a flow channel 22 for air flowing via the fan 18, wherein said flow channel 22 extends in the axial direction A of the ducted fan 17. As viewed in the radial direction R of the ducted fan 17, the duct 19 surrounds the rotor or fan 18 radially at the outside.

The duct 19 of the ducted fan 17 has an inner wall 23, which faces toward the fan 18 of the ducted fan 17, and an outer wall 24, which is averted from the fan 18. Both the inner wall 23 and the outer wall 24 are composed in each case of at least one layer composed of fiber-reinforced plastic, preferably composed of a carbon-fiber-reinforced plastic or alternatively of a glass-fiber-reinforced plastic. The inner wall 23 of the duct 19 of the ducted fan 17 defines the flow channel 22 of the ducted fan 17 for the air flowing via the rotor or fan 18.

Preferably, both the inner wall 23 and the outer wall 24 of the duct 19 are formed from multiple layers composed of fiber-reinforced plastic, specifically the inner wall 23 of the ducts 19 from a first number of layers and the outer wall 24 from a second number of layers, wherein the first number is preferably greater than the second number. It is in the case that more layers composed of fiber-reinforced plastic are laminated to form a wall in the region of the inner wall 23 than in the region of the outer wall 24. It is possible that, in the region of the inner wall 23, three layers composed of fiber-reinforced plastic, and in the region of the outer wall 24, two layers composed of fiber-reinforced plastic, form the corresponding wall 23, 24.

The layers composed of fiber-reinforced plastic that form the inner wall 23 and the outer wall 24 of the duct 19 of the ducted fan 17 are preferably layers composed of multi-directional fiber-reinforced plastic. The fibers of the fiber-reinforced plastic then run in different directions.

Figure 6:
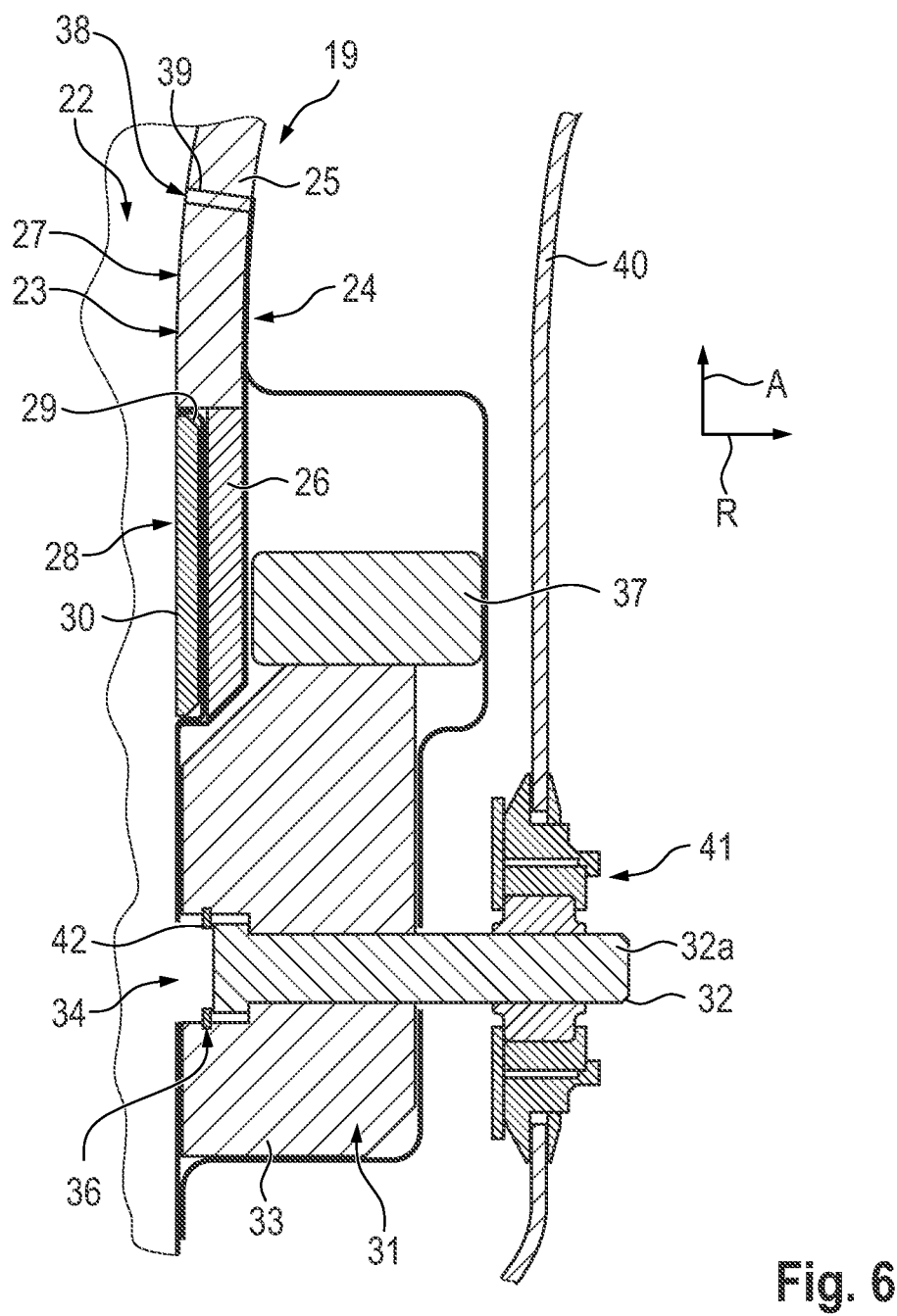
FIG. 6 shows the cross section VI-VI of FIG. 5 together with an adjoining or adjacent structural component of the aircraft.
Figure 7:
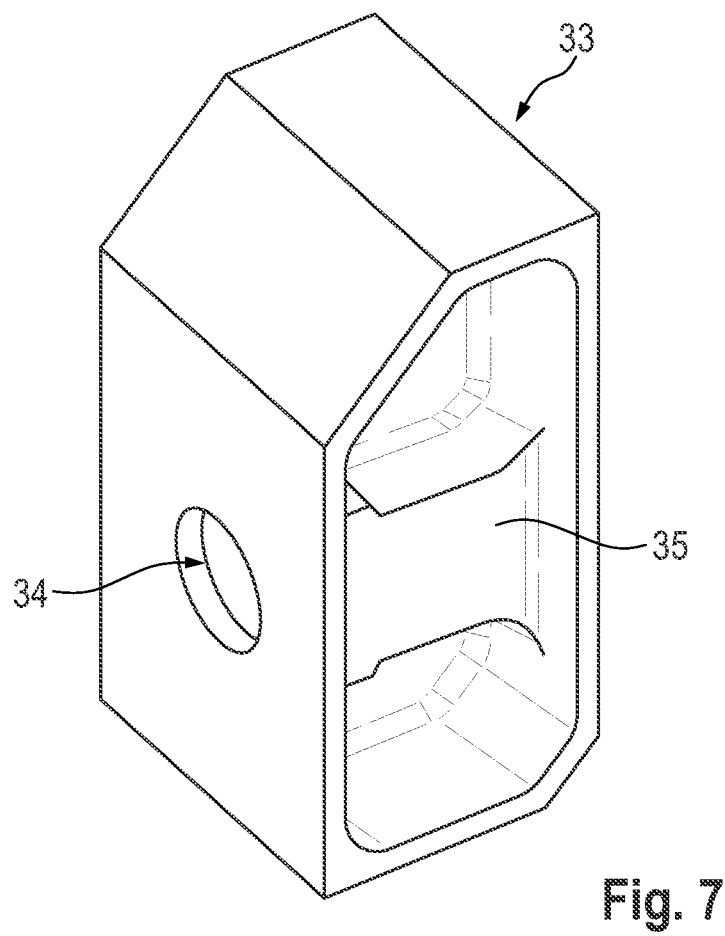
FIG. 7 shows a detail of FIGS. 5 and 6.

Between the inner wall 23 and the outer wall 24 of the duct 19 of the ducted fan 17, there are arranged honeycomb cores 25, 26, which abut against one another in an axial direction A of the ducted fan 17 (see FIG. 6). Each of the honeycomb cores 25, 26 has a multiplicity of honeycombs 38, wherein the honeycombs 38 extend in a radial direction R or substantially in the radial direction R of the ducted fan 17. In FIG. 6, one honeycomb 38 is shown in the region of the honeycomb core 25. In the case of honeycombs 38 which extend in the radial direction R, walls 39, which define the honeycombs 38, of the respective honeycomb core 25, 26 run in the radial direction R between the inner wall 23 and the outer wall 24. Adjoining the inner wall 23 and the outer wall 24, the honeycombs 38 of the respective honeycomb core 25, 26 are open.

In an inlet-side section 27 of the duct 19 of the ducted fan 17, in which said duct is contoured with a funnel-like curvature, the honeycombs 38 run substantially in the radial direction R of the duct 19 and thus of the ducted fan 17. The honeycombs 38 are then inclined relative to the radial direction R. By contrast, in an outlet-side section 28 of the duct 19 and thus of the ducted fan 17, the honeycombs 38 of the respective honeycomb body 26, 27 run in the radial direction. Here, the duct 19 of the ducted fan 17 has a tubular or cylindrical contour.

Figure 4:
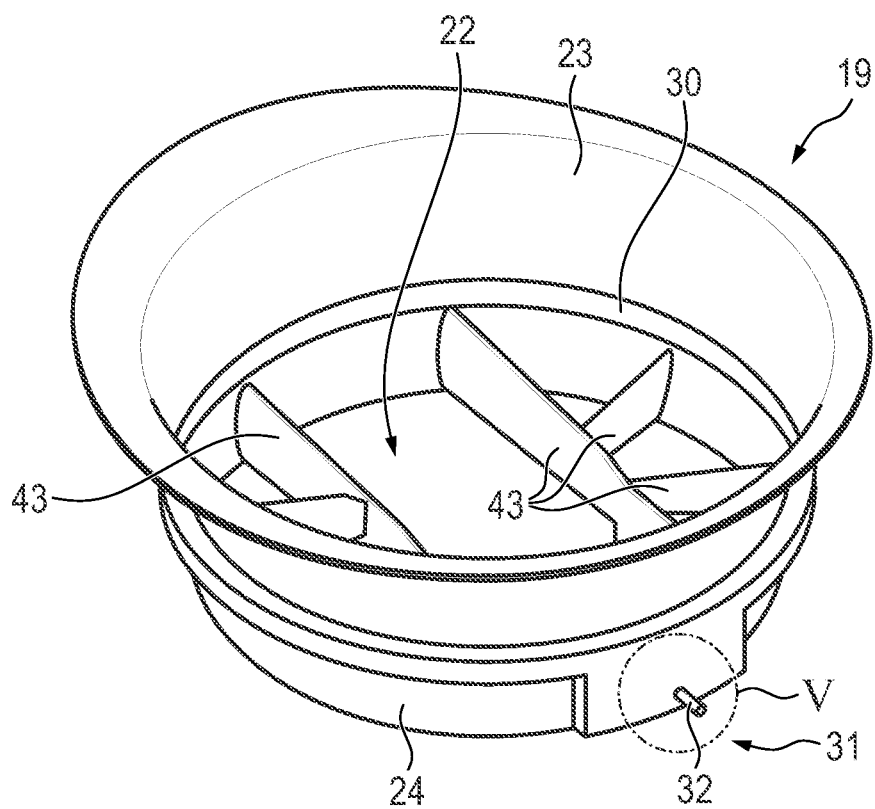
FIG. 4 shows a perspective view of a duct of the ducted fan.
Figure 5:
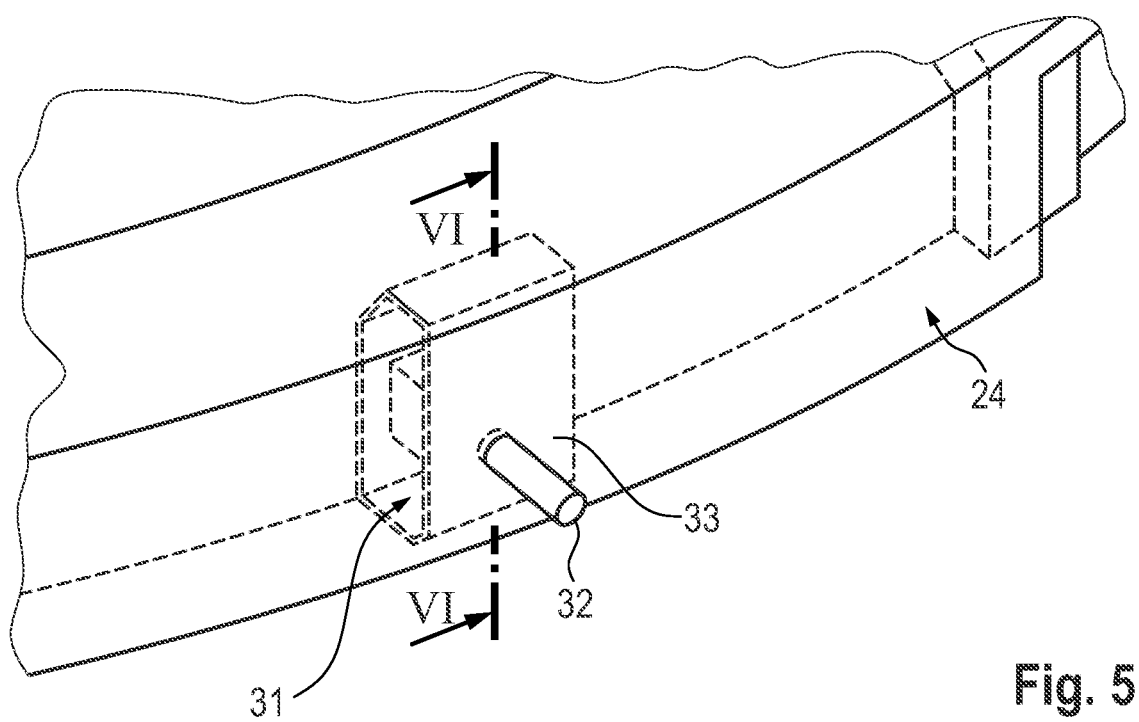
FIG. 5 shows the detail V of FIG. 4.

As per FIGS. 4 and 6, the duct 19 of the ducted fan 17 has, at one axial position, a notch 29 which receives a run-in body 30. Said run-in body 30 is preferably a foam body, wherein rotor blades of the rotor or fan 18 of the ducted fan 17 can run into said run-in body 30 during operation, in order that the rotor blades of the rotor 18 are not damaged during operation.

As can be seen from FIG. 4, stiffening struts 43 for the duct 19 extend in certain sections within the flow channel 22 defined by the inner wall 23 of the duct 19 of the ducted fan 17, which stiffening struts have flow-guiding surfaces for the air flowing through the flow channel 22 and thus via the fan 18. The flow-guiding surfaces of said stiffening struts 43 are aerodynamically contoured such that the guidance of the air flowing via the fan 18 of the ducted fan 17 is improved in the region of the flow channel 22.

The ducted fan 17 has at least one fastening device 31, which is formed at a respective circumferential position of the duct 19 of the ducted fan 17. By means of the respective fastening device 31, the ducted fan 17 can be mounted on an adjoining or adjacent structural component 40 of the aircraft.

The respective fastening device 31 has a pin 32 and a guide body 33 which is arranged between the inner wall 23 and the outer wall 24 of the duct 19. The guide body 33 serves for receiving and guiding the pin 32, specifically such that the pin 32 is insertable proceeding from the inner wall 23 and accordingly from the flow channel 22 into a recess 34 of the guide body 33, protrudes with one end 32a relative to the outer wall 24 of the duct 19, and can be mounted by way of said end 32a on a preferably spherical bearing 41 of the adjoining or adjacent structural component 40 of the aircraft. Whereas the inner wall 23 and the outer wall 24 of the duct 19 are manufactured from a fiber-reinforced plastic, preferably from a carbon-fiber-reinforced plastic or from a glass-fiber-reinforced plastic, the guide body 33 is a metallic guide body, composed preferably of aluminum, and the pin 32 is a metallic pin. The guide body 33 is preferably a milled guide body which is not of solid design but which, for the purposes of weight reduction, is designed a hollow component with stiffening struts 35 which extend in the interior of the hollow component.

The pin 32 and the recess 34, which receives the pin 32, of the guide body 33 have a stepped contour. This stepped contour of pin 32 and recess 34 limit the insertion depth of the pin 32 into the recess 34 of the guide body 33.

In the recess 34 of the guide body 33, there is formed a groove 36 into which, proceeding from the inner wall 23 of the duct 19, a securing ring 42 can be inserted in order to secure the guide pin 32 in the recess 34.

The guide body 33 is adhesively bonded to the inner wall 23 and to the outer wall 24, preferably over a full area. In this way, the stiffness of the ducted fan 17 in the region of the duct 19, specifically in the region of the respective fastening device 31, is increased. This adhesive bonding of the guide body 32 to the inner wall 23 and to the outer wall 24 of the duct 19 is preferably realized over a full area.

According to one advantageous refinement, adjoining the guide body 33 between the inner wall 23 and the outer wall 24 of the duct 19, there is arranged a foam body 37 encased by at least one layer composed of fiber-reinforced plastic, wherein the guide body 33 is also adhesively bonded to the encased foam body 37. The foam body 37 is likewise adhesively bonded to the outer wall 24.

The ducted fan 17 can be advantageously mounted on the adjoining or adjacent structural component 40 of the aircraft. Said structural component exhibits high stiffness. The recess 34 is formed only a short time before the ducted fan 17 is mounted on the adjoining or adjacent structural component 40 of the aircraft 10, whereby tolerance compensation during the assembly of the aircraft 10 can be ensured.

The disclosure also relates to the aircraft 10. The aircraft 10 has the above-described fuselage 11 and wings 13 that engage on the fuselage 11. Furthermore, the aircraft 10 has at least one ducted fan 17.

The ducted fan 17 may engage on the wing 13 as a constituent part of a wing lift unit 14 or on the nose 16 of the fuselage 11 as a constituent part of a nose lift unit 15.

The forward thrust unit 12 may also have a ducted fan 17.

The respective ducted fan 17 is designed as described in detail above. In particular, the ducted fan 17 engages on a respective wing 13 as a constituent part of a wing lift unit 14.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A ducted fan for an aircraft, the ducted fan comprising:
   a rotor-side fan,
   a stator-side duct that surrounds the rotor-side fan radially at an outside and defines a flow channel for air flowing via the fan, the stator-side duct comprising:
      an inner wall facing the rotor-side fan, the inner wall including at least one layer composed of fiber-reinforced plastic, and
      an outer wall averted from the fan, the outer wall including at least one layer composed of fiber-reinforced plastic,
   a fastening device formed at a respective circumferential position of the stator-side duct and configured to support mounting of the ducted fan on a structural component of the aircraft, the fastening device including a pin and a guide body arranged between the inner wall and the outer wall of the stator-side duct, the guide body configured to receive and guide the pin,
   wherein the pin is insertable proceeding from the inner wall into a recess of the guide body,
   wherein a first end of the pin protrudes relative to the outer wall, and
   wherein the pin is configured to be mounted, via the first end, on a bearing of the structural component of the aircraft.

2. The ducted fan as claimed in claim 1, wherein the guide body is a metallic guide body comprising aluminum.

3. The ducted fan as claimed in claim 1, wherein the guide body is a milled guide body.

4. The ducted fan as claimed in claim 1, wherein the pin is a metallic pin.

5. The ducted fan as claimed in claim 1, wherein the pin and the recess of the guide body have a stepped contour configured to limit an insertion depth of the pin into the recess.

6. The ducted fan as claimed in claim 1, wherein the guide body is adhesively bonded to the inner wall and to the outer wall of the stator-side duct.

7. The ducted fan as claimed in claim 6, wherein the guide body is adhesively bonded to the inner wall and to the outer wall of the stator-side duct over a full area.

8. The ducted fan as claimed in claim 1, further comprising a foam body adjoining the guide body between the inner wall and the outer wall, the foam body being encased by at least one layer composed of fiber-reinforced plastic, wherein the guide body is adhesively bonded to the foam body.

9. An aircraft, comprising:
   a fuselage that provides a passenger compartment,
   wings that engage on the fuselage,
   the ducted fan according to claim 1, wherein the ducted fan engages on the fuselage or on the wings.

10. The aircraft as claimed in claim 9, wherein the ducted fan engages on a structural component of a first wing of the wings.

\* \* \* \* \*